April 18, 1933.   E. GASIOROWSKI   1,904,442
HIGH TENSION SWITCH PLANT
Filed Jan. 9, 1930
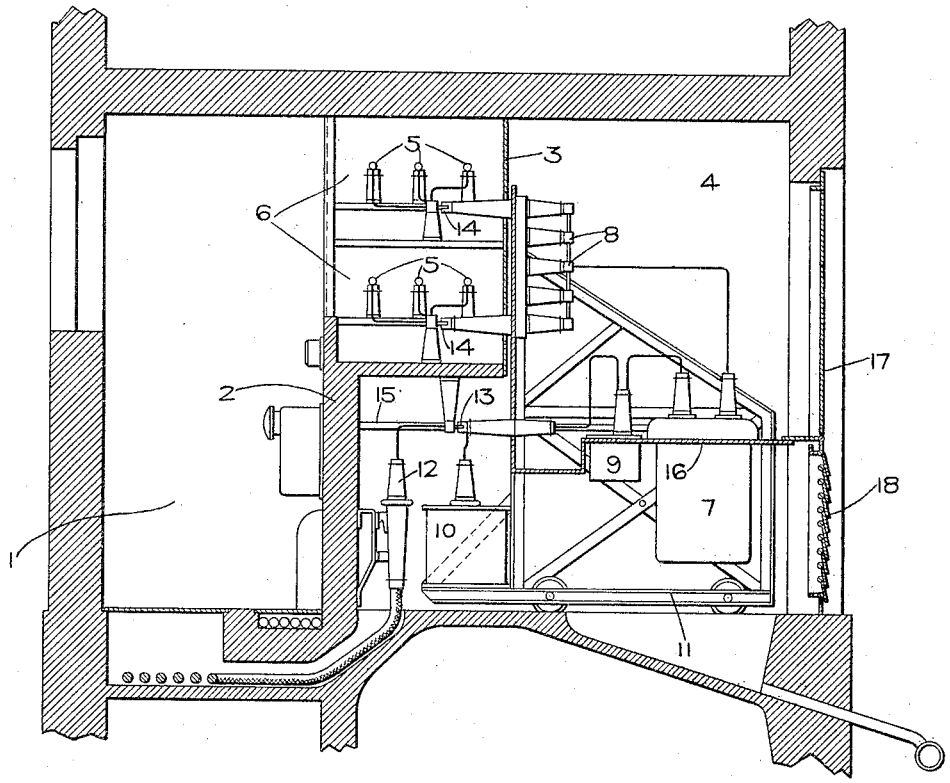
Inventor:
Ernst Gasiorowski,
by Charles E. Tullar
His Attorney.

Patented Apr. 18, 1933

1,904,442

UNITED STATES PATENT OFFICE

ERNST GASIOROWSKI, OF BERLIN-HERMSDORF, GERMANY, ASSIGNOR TO GENERAL ELECTRIC COMPANY, A CORPORATION OF NEW YORK

HIGH TENSION SWITCH PLANT

Application filed January 9, 1930, Serial No. 419,706, and in Germany April 25, 1929.

My invention relates to high tension bus and switch stations, and more particularly to that type embodying the truck or movable carriage principle.

Important considerations in the construction of electrical high-tension bus and switch stations include safeguarding the attendants, obtaining the greatest certainty of operation, a minimum space demand, and easy accessibility and supervision. A well known arrangement, for instance, is used which extends over various floors and contains various control and attendance galleries. The latter, in this case, are shut off and safeguarded by massive walls for the purpose of protection against fire and other hazards. The closure of the bus-bar chambers with respect to all oil-containing apparatus is also effected in a similar manner.

Another type of construction in switch plants is the high-tension bus and switch station which is encased in cast-iron, the enclosure being filled in with an insulating mass, or compound, and divided up into switching sections. This arrangement makes it possible to limit extensive and large capacity switch plants to comparatively small spaces, while permitting very easy assembly and considerable saving of time. However, this latter arrangement has the disadvantage in that the attendants and the switch sections are greatly endangered if an explosion occurs in any one of the switching sections.

In a third type of construction in switch plants there are utilized trunk-type switches with air insulation, which are installed in cells, or compartments. The cell walls generally consist of metal plate and they do not, when explosions occur, for instance, offer sufficient protection either to the attendants or to the other unaffected cells or switch apparatus. The spaced demand of such switching plants is, corresponding to the necessary air spaces, somewhat greater than that of a cast-iron installation for the same electrical requirements, but, nevertheless, when compared with a normal open installation, it is considerably smaller. This switching arrangement offers a great advantage over the preceding types due to the fact that all of the parts of a particular section, after being drawn out of the cell are without voltage and easily accessible. That is, removal of the truck from the cell effects in a well known manner, as by plug and socket contacts, the disconnection of the switch from the bus bars. Furthermore, such a switch plant, with only a small extra requirement of space, is considerably lower in cost as compared with an encased or cast switch plant.

An object of the present invention is the provision of a new and improved type of high-tension bus and switch station which combines the advantages of the well-known open switch plants with their special protection of the neighboring cells and switch gear, as well as of the attendants, and a truck type switch plant which demands little space and, in the present instance, permits complete control without danger over the whole plant.

For the above purpose, the switching apparatus of each section, the bus-bar systems as well as the attendance gallery, are separated from each other by fire and explosion-proof walls and the whole switching apparatus of each section arranged on a movable stand or truck so that it can be moved as a unit.

My invention will be more fully set forth in the following description referring to the accompanying drawing, and the features of novelty which characterize my invention will be pointed out with particularity in the claims annexed to and forming a part of this specification.

Referring to the drawing, the single figure thereof illustrates an elevational, sectional view of a high tension switch plant embodying one form of my invention.

The switch plant embodying my invention is shown constructed fundamentally according to the well-known cell system. The attendance gallery 1 is separated from the chambers which contain the high-tension switching apparatus partly by a massive wall 2, and partly by a complete sheet-metal wall 3. The individual switch sections are arranged in cells which are shut off and isolated from one another by massive fire-proof walls. The two bus-bar systems 5, comprising main and auxiliary busses, are each located in a box or compartment 6, which extends throughout the entire length of the plant. The compartment 6 is open towards the attendance gallery 1, and is closed with respect to the high-tension chamber or compartment 4 by the complete sheet-metal wall 3 previously mentioned.

The entire high-tension switchgear or apparatus of each cell, which may consist, for example, of an oil switch 7, two isolating or disconnecting switches 8, a current transformer 9 and a voltage transformer 10, is mounted on a movable stand or truck 11. As in the case of truck-type switch plants, the connection between the movable unit and the stationary unit comprising the rigidly mounted cable or feeder connection 12 and the bus-bars 5, is suitably made as by means of plug and socket contacts at the points 13 and 14.

The actuating rods 15 of the isolating switches, as well as of the oil switch of each section, are arranged in accordance with my invention in such a way that in moving out the apparatus they are separated, and in moving in the same they are again operatively coupled. By means of mechanical interlocking devices, well-known in the art, care is taken that movement of the apparatus can be effected only when the oil switch is opened. In the same manner the opening and closing of the isolating switches can, by means of interlocking devices, be made independent of the position of the oil switch and of the mutual position of the isolating switches. The switch cells are preferably arranged in such a way that the apparatus can be moved out either directly into the open, or into a common passage for conveyance.

In order to keep any waste gases away from the bus-bars, or other apparatus and thereby preventing dangerous flash-overs, the vessels of the individual apparatus containing oil are sealed with respect to the isolating switch chamber 4 by a horizontally disposed complete sheet-metal intermediate cover 16. The cell door 17, which likewise consists entirely of metal plate, is provided at its lower part with shutters 18, similar to venetian-blinds, which are opened only by an excess gas pressure arising in the cell, thereby allowing the gases to escape into the open.

It shall be understood that my invention is not limited to specific details of construction and arrangement thereof herein illustrated, and that changes and modifications may occur to one skilled in the art without departing from the spirit of my invention.

What I claim as new and desire to secure by Letters Patent of the United States, is,—

1. A high tension switching station comprising a bus-bar compartment, a switching compartment extending in part beneath said bus-bar compartment, an isolating partition between said bus-bar and switching compartments, and a movable switch-gear unit mounted within said switching compartment having detachable connections extending beneath said bus-bar compartment and through said isolating partition into said bus-bar compartment.

2. A high tension bus and switch station including a cell having a bus-bar compartment and a switching chamber, said bus compartment containing main and auxiliary buses, switchgear of the draw-out type movable as a unit in said switching chamber comprising a truck, oil-containing receptacles including an oil circuit breaker mounted on said truck, a protective wall carried by said truck dividing said switching chamber into an upper section adjacent said bus-bar compartment and a lower section in which said oil-containing receptacles are disposed, and means carried by said truck and disposed in said upper section for connecting and disconnecting either the main or auxiliary bus through said oil circuit breaker to a feeder connection including disconnecting contacts and isolating switching means.

3. A high tension switching station comprising a cell, said cell being divided into an attendance gallery, a bus-bar compartment and a high tension switching chamber extending in part beneath said bus-bar compartment, a protective wall for separating the high tension chamber from the attendance gallery and bus bar compartment, electrical switchgear disposed within the high tension compartment and adapted to be detachably electrically connected to bus-bars and a feeder connection beneath said bus-bar compartment through said protective wall, and a truck comprising, together with said switchgear, a movable unit adapted to be withdrawn from said cell and isolated therefrom.

In witness whereof, I have hereunto set my hand this 20th day of December, 1929.

ERNST GASIOROWSKI.